US012341262B2

(12) United States Patent
Chang

(10) Patent No.: US 12,341,262 B2
(45) Date of Patent: Jun. 24, 2025

(54) MOBILE DEVICE FOR REDUCING SPECIFIC ABSORPTION RATE

(71) Applicant: Acer Incorporated, New Taipei (TW)

(72) Inventor: Kun-Sheng Chang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 184 days.

(21) Appl. No.: 18/330,572

(22) Filed: Jun. 7, 2023

(65) Prior Publication Data

US 2024/0322430 A1 Sep. 26, 2024

(30) Foreign Application Priority Data

Mar. 21, 2023 (TW) ................................ 112110337

(51) Int. Cl.
*H01Q 1/48* (2006.01)
*H01Q 1/52* (2006.01)
*H01Q 5/40* (2015.01)

(52) U.S. Cl.
CPC ................. *H01Q 5/40* (2015.01); *H01Q 1/48* (2013.01); *H01Q 1/52* (2013.01)

(58) Field of Classification Search
CPC ............ H01Q 1/48; H01Q 1/52; H01Q 1/243; H01Q 1/245; H01Q 1/2266; H01Q 5/40;
(Continued)

(56) References Cited

U.S. PATENT DOCUMENTS 9,136,599 B2 * 9/2015 Su .......................... H01Q 5/357
9,673,512 B2 6/2017 Lin
(Continued)

FOREIGN PATENT DOCUMENTS

CN 105552532 B 12/2018
CN 108242589 B 10/2020
(Continued)

OTHER PUBLICATIONS

Chinese language office action dated Mar. 12, 2024, issued in application No. TW 112110337.

*Primary Examiner* — Tung X Le
(74) *Attorney, Agent, or Firm* — McClure, Qualey & Rodack, LLP

(57) ABSTRACT

A mobile device for reducing SAR (Specific Absorption Rate) includes a feeding radiation element, a first radiation element, a second radiation element, a grounding radiation element, a first metal element, a second metal element, and a dielectric substrate. The feeding radiation element has a feeding point. The first radiation element is coupled to the feeding radiation element. The second radiation element is coupled to the feeding radiation element. The second radiation element and the first radiation element substantially extend in opposite directions. The grounding radiation element is coupled to the ground voltage. The first metal element is coupled to the grounding radiation element. The second metal element is coupled to the ground voltage. The second metal element is adjacent to the feeding radiation element. An antenna structure is formed by the feeding radiation element, the first radiation element, the second radiation element, and the grounding radiation element.

14 Claims, 5 Drawing Sheets

(58) Field of Classification Search
CPC ........ H01Q 5/371; H01Q 5/378; H01Q 5/385; H01Q 9/42; H01Q 21/28; H01Q 21/30
See application file for complete search history.

(56) References Cited

U.S. PATENT DOCUMENTS

| | | | | |
|---|---|---|---|---|
| 9,992,312 | B1 | 6/2018 | Deng et al. | |
| 10,505,262 | B2 | 12/2019 | Liu et al. | |
| 2021/0167491 | A1 * | 6/2021 | Chang | H01Q 1/48 |
| 2021/0351509 | A1 * | 11/2021 | Lin | H01Q 1/245 |
| 2022/0263243 | A1 * | 8/2022 | Sakurai | H01Q 9/16 |
| 2024/0195082 | A1 * | 6/2024 | Lo | H01Q 21/28 |

FOREIGN PATENT DOCUMENTS

| | | | |
|---|---|---|---|
| TW | 201622248 | A | 6/2016 |
| TW | 201907615 | A | 2/2019 |

* cited by examiner

MOBILE DEVICE FOR REDUCING SPECIFIC ABSORPTION RATE

CROSS REFERENCE TO RELATED APPLICATIONS

This application claims priority of Taiwan Patent Application No. 112110337 filed on Mar. 21, 2023, the entirety of which is incorporated by reference herein.

BACKGROUND OF THE INVENTION

Field of the Invention

The disclosure generally relates to a mobile device, and more particularly, it relates to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna is an indispensable component in a mobile device that supports wireless communication. However, the antenna is easily affected by adjacent metal components, which often interfere with the antenna and degrade the overall communication quality. Alternatively, the SAR (Specific Absorption Rate) may be too high to comply with regulations and laws. Accordingly, there is a need to propose a novel solution for solving the problems of the prior art.

BRIEF SUMMARY OF THE INVENTION

In an exemplary embodiment, the disclosure is directed to a mobile device for reducing SAR (Specific Absorption Rate). The mobile device includes a feeding radiation element, a first radiation element, a second radiation element, a grounding radiation element, a first metal element, a second metal element, and a dielectric substrate. The feeding radiation element has a feeding point. The first radiation element is coupled to the feeding radiation element. The second radiation element is coupled to the feeding radiation element. The second radiation element and the first radiation element substantially extend in opposite directions. The grounding radiation element is coupled to the ground voltage. The grounding radiation element is adjacent to the first radiation element and the second radiation element. The first metal element is coupled to the grounding radiation element. The second metal element is coupled to the ground voltage. The second metal element is adjacent to the feeding radiation element. The feeding radiation element, the first radiation element, the second radiation element, the grounding radiation element, the first metal element, and the second metal element are all disposed on the dielectric substrate. An antenna structure is formed by the feeding radiation element, the first radiation element, the second radiation element, and the grounding radiation element.

In some embodiments, the combination of the feeding radiation element, the first radiation element, and the second radiation element substantially has a T-shape.

In some embodiments, the grounding radiation element substantially has a variable-width L-shape and includes a wide portion and a narrow portion, and the narrow portion is coupled through the wide portion to the ground voltage.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the feeding radiation element and the first radiation element is substantially equal to 0.25 wavelength of the third frequency band.

In some embodiments, the total length of the feeding radiation element and the second radiation element is substantially equal to 0.25 wavelength of the second frequency band.

In some embodiments, the length of the grounding radiation element is substantially equal to 0.25 wavelength of the first frequency band.

In some embodiments, the first metal element is excited to generate a first resonant frequency interval, and the second metal element is excited to generate a second resonant frequency interval. The first resonant frequency interval is from 4500 MHz to 4800 MHz. The second resonant frequency interval is from 7500 MHz to 7800 MHz.

In some embodiments, the first metal element substantially has a straight-line shape. The length of the first metal element is substantially equal to 0.25 wavelength of the first resonant frequency interval.

In some embodiments, the second metal element substantially has an L-shape. The length of the second metal element is substantially equal to 0.25 wavelength of the second resonant frequency interval.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
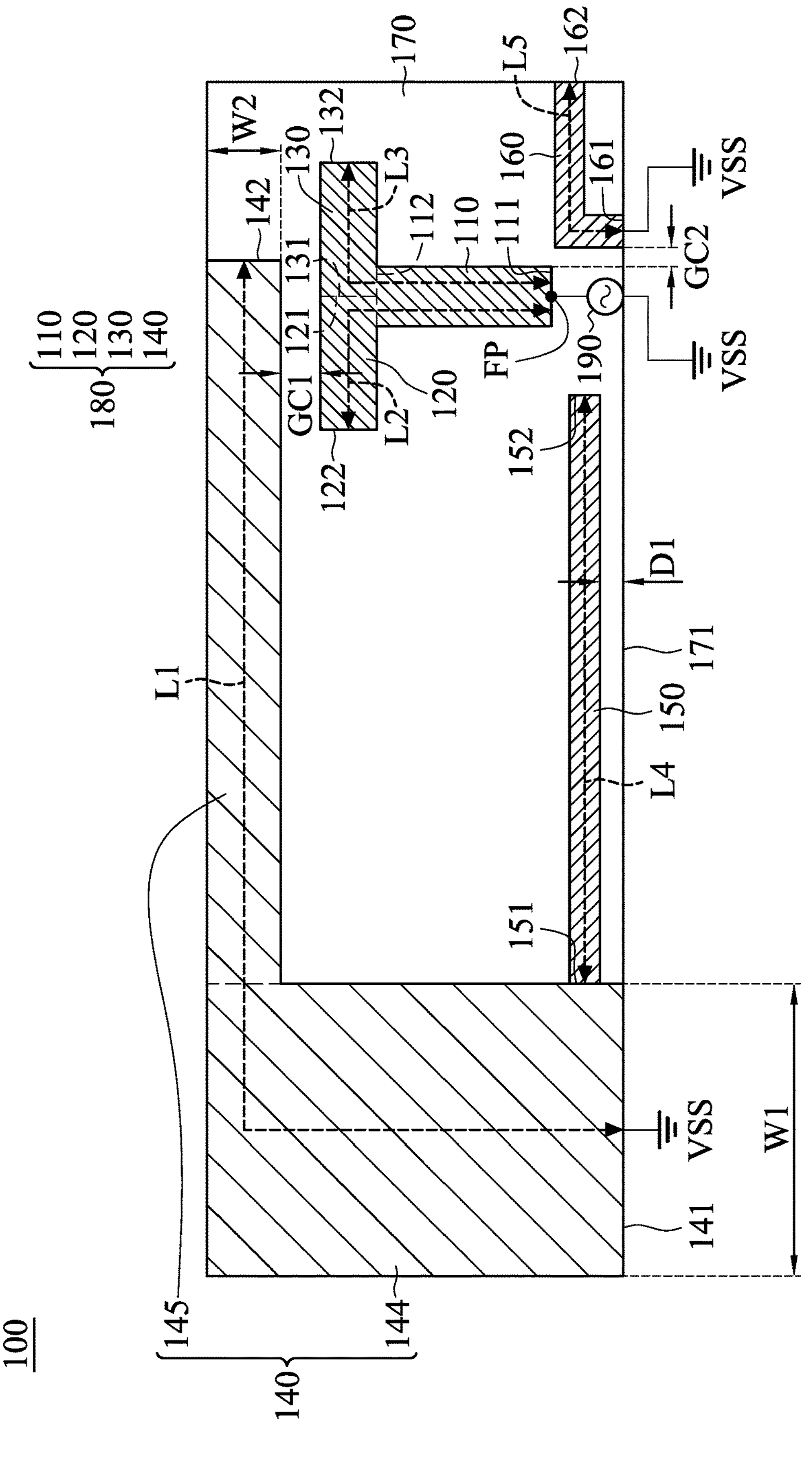
FIG. 1 is a top view of a mobile device according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. In the embodiment of FIG. 1, the mobile device 100 includes a feeding radiation element 110, a first radiation element 120, a second radiation element 130, a grounding radiation element 140, a first metal element 150, a second metal element 160, and a dielectric substrate 170. The feeding radiation element 110, the first radiation element 120, the second radiation element 130, and the grounding radiation element 140 may all be made of metal materials, such as copper, silver, aluminum, iron, or their alloys. It should be understood that the mobile device 100 may further include other components, such as a processor, a touch control panel, a speaker, a battery module, and a housing, although they are not displayed in FIG. 1.

The feeding radiation element 110 may substantially have a straight-line shape. Specifically, the feeding radiation element 110 has a first end 111 and a second end 112. A feeding point FP is positioned at the first end 111 of the feeding radiation element 110. The feeding point FP may also be coupled to a signal source 190. For example, the signal source 190 may be an RF (Radio Frequency) module.

The first radiation element 120 may substantially have a straight-line shape, which may be substantially perpendicular to the feeding radiation element 110. Specifically, the first radiation element 120 has a first end 121 and a second end 122. The first end 121 of the first radiation element 120 is coupled to the second end 112 of the feeding radiation element 110. The second end 122 of the first radiation element 120 is an open end.

The third radiation element 130 may substantially have another straight-line shape, which may also be substantially perpendicular to the feeding radiation element 110. Specifically, the second radiation element 130 has a first end 131 and a second end 132. The first end 131 of the second radiation element 130 is coupled to the second end 112 of the feeding radiation element 110 and the first end 121 of the first radiation element 120. The second end 132 of the second radiation element 130 is an open end. For example, the second end 132 of the second radiation element 130 and the second end 122 of the first radiation element 120 may substantially extend in opposite directions and away from each other. In some embodiments, the combination of the feeding radiation element 110, the first radiation element 120, and the second radiation element 130 substantially has a T-shape.

The grounding radiation element 140 may substantially have a variable-width L-shape. Specifically, the grounding radiation element 140 has a first end 141 and a second end 142. The first end 141 of the grounding radiation element 140 is coupled to the ground voltage VSS. The second end 142 of the grounding radiation element 140 is an open end, which is adjacent to the first radiation element 120 and the second radiation element 130. For example, a first coupling gap GC1 may be formed between the grounding radiation element 140 and the first radiation element 120 or the second radiation element 130. In some embodiments, the grounding radiation element 140 includes a wide portion 144 adjacent to the first end 141 and a narrow portion 145 adjacent to the second end 142, and the narrow portion 145 is coupled through the wide portion 144 to the ground voltage VSS. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing therebetween is reduced to 0). In some embodiments, the ground voltage VSS is provided by a system ground plane (not shown) of the mobile device 100.

The first metal element 150 may substantially have a straight-line shape, which may be substantially parallel to the narrow portion 145 of the grounding radiation element 140. Specifically, the first metal element 150 has a first end 151 and a second end 152. The first end 151 of the first metal element 150 is coupled to the first end 141 of the grounding radiation element 140 (or the ground voltage VSS). The second end 152 of the first metal element 150 is an open end. For example, the second end 152 of the first metal element 150 and the second end 142 of the grounding radiation element 140 may substantially extend in the same direction. In addition, the first metal element 150 may be substantially positioned between the wide portion 144 of the grounding radiation element 140 and the feeding radiation element 110. In some embodiments, the first metal element 150 is disposed adjacent to an edge 171 of the dielectric substrate 170, and the first metal element 150 is substantially parallel to the edge 171 of the dielectric substrate 170.

The second metal element 160 may substantially have an L-shape, which may be adjacent to the feeding radiation element 110. For example, a second coupling gap GC2 may be formed between the second metal element 160 and the feeding radiation element 110. Specifically, the second metal element 160 has a first end 161 and a second end 162. The first end 161 of the second metal element 160 is coupled to the ground voltage VSS. The second end 162 of the second metal element 160 is an open end. For example, the second end 162 of the second metal element 160 and the second end 152 of the first metal element 150 may substantially extend in the same direction.

The dielectric substrate 170 may be an FR4 (Flame Retardant 4) substrate, a PCB (Printed Circuit Board), or an FPC (Flexible Printed Circuit), but it is not limited thereto. In some embodiments, the feeding radiation element 110, the first radiation element 120, the second radiation element 130, the grounding radiation element 140, the first metal element 150, and the second metal element 160 are all disposed on the same surface of the dielectric substrate 170.

In a preferred embodiment, an antenna structure 180 of the mobile device 100 is formed by the feeding radiation element 110, the first radiation element 120, the second radiation element 130, and the grounding radiation element 140. In some embodiments, the antenna structure 180 is a planar antenna structure. However, the invention is not limited thereto. In alternative embodiments, the antenna structure 180 is modified to a 3D (Three Dimensional) antenna structure.

Figure 2:
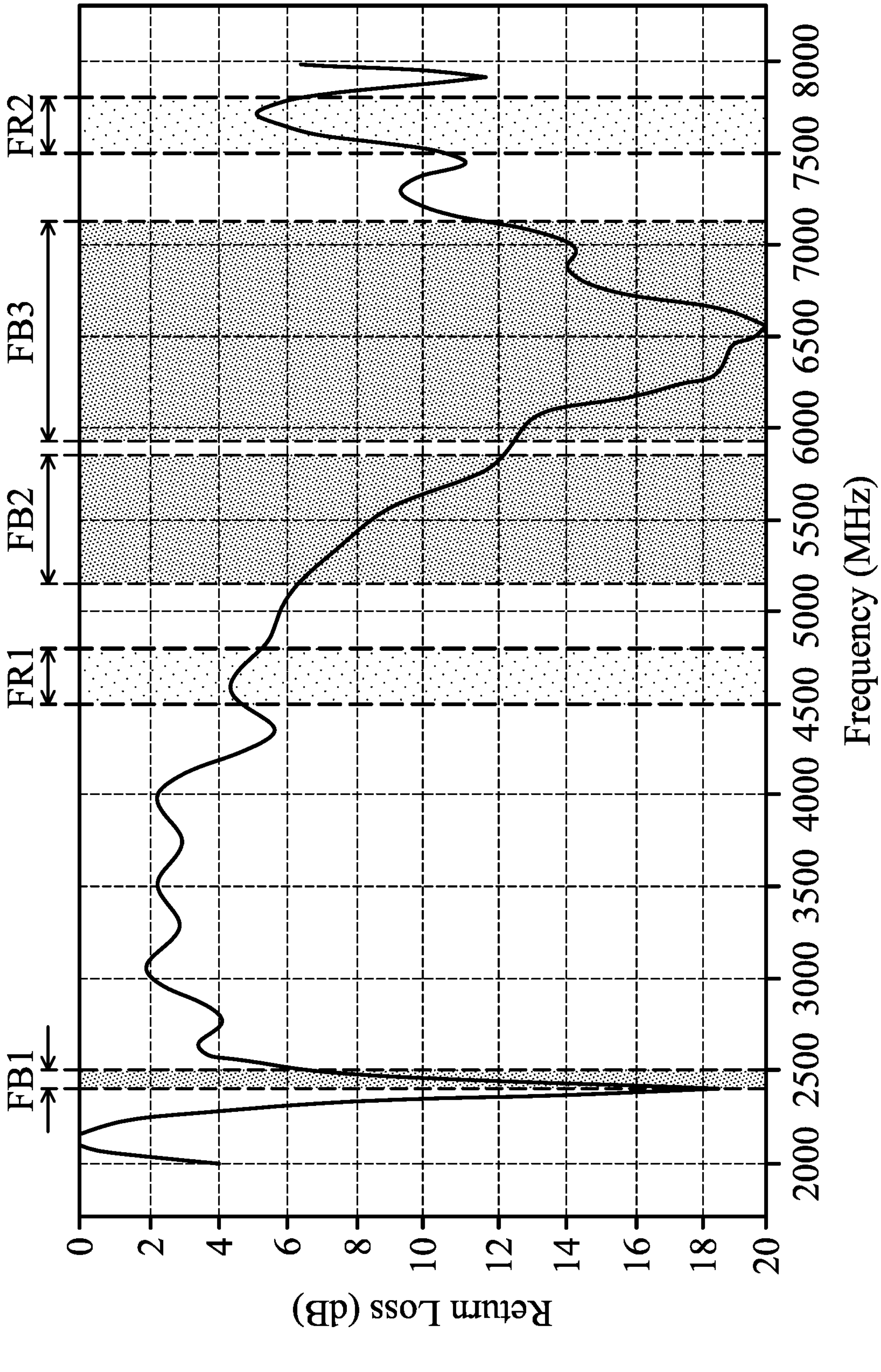
FIG. 2 is a diagram of return loss of an antenna structure of a mobile device according to an embodiment of the invention.

FIG. 2 is a diagram of return loss of the antenna structure 180 of the mobile device 100 according to an embodiment of the invention. The horizontal axis represents the operational frequency (MHz), and the vertical axis represents the return loss (dB). According to the measurements illustrated in FIG. 2, the antenna structure 180 of the mobile device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the mobile device 100 can support at least the wideband operations of conventional WLAN (Wireless Local Area Network) and next-generation Wi-Fi 6E.

In addition, the first metal element 150 can be excited to generate a first resonant frequency interval FR1, and the second metal element 160 can be excited to generate a second resonant frequency interval FR2. The first resonant frequency interval FR1 may be from 4500 MHz to 4800 MHz, and the second resonant frequency interval FR2 may be from 7500 MHz to 7800 MHz. It should be noted that neither the first resonant frequency interval FR1 nor the second resonant frequency interval FR2 overlaps the first frequency band FB1, the second frequency band FB2, or the third frequency band FB3 as mentioned above.

In some embodiments, the operational principles of the antenna structure 180 of the mobile device 100 will be described below. The grounding radiation element 140 can be excited by the feeding radiation element 110, the first radiation element 120, and the third radiation element 130 using a coupling mechanism, so as to generate the aforementioned first frequency band FB1. The feeding radiation element 110 and the second radiation element 130 can be excited to generate the aforementioned second frequency band FB2. The feeding radiation element 110 and the first radiation element 120 can be excited to generate the aforementioned third frequency band FB3.

According to practical measurements, the first metal element 150 can change the current distribution on the grounding radiation element 140 and decrease the current density thereof, so as to reduce the SAR (Specific Absorption Rate) of the antenna structure 180 within the second frequency band FB2. Similarly, the second metal element 160 can also change the current distribution on the feeding radiation element 110 and decrease the current density thereof, so as to reduce the SAR of the antenna structure 180 within the third frequency band FB3. It should be noted that since the first resonant frequency interval FR1 and the second resonant frequency interval FR2 do not overlap the first frequency band FB1, the second frequency band FB2, and the third frequency band FB3, the radiation performance of the antenna structure 180 is not negatively affected by the first metal element 150 and the second metal element 160 so much. For example, on the condition that the SAR requirements of laws are satisfied, the incorporation of the first metal element 150 and the second metal element 160 helps to enhance the transmission power of the antenna structure 180 by 0.5 dB to 1.5 dB (especially for the second frequency band FB2 and the third frequency band FB3 as mentioned above), and therefore the overall communication quality of the mobile device 100 will be significantly improved.

Figure 3:
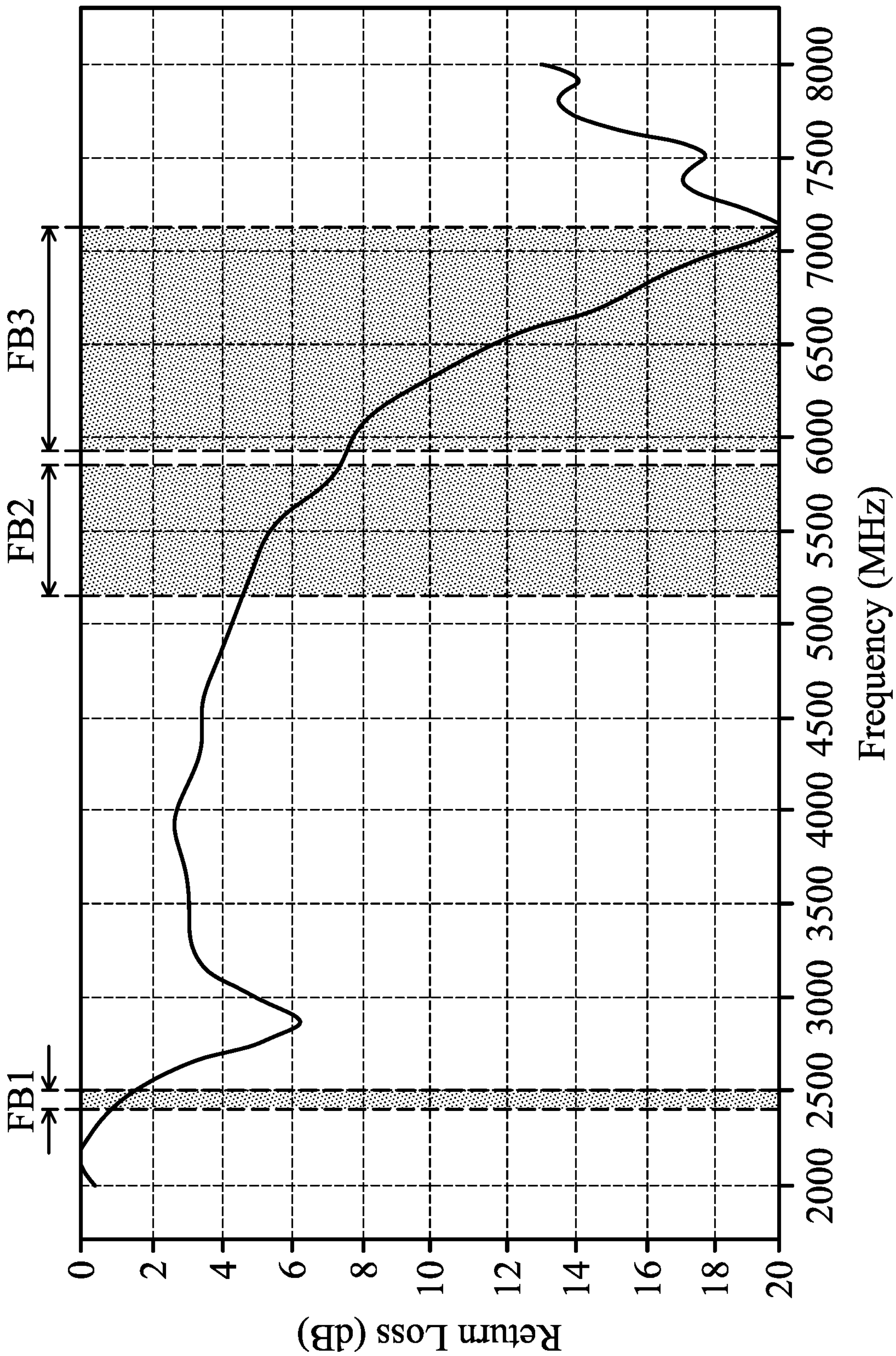
FIG. 3 is a diagram of return loss of an antenna structure when a mobile device does not include a first metal element and a second metal element.

FIG. 3 is a diagram of return loss of the antenna structure 180 when the mobile device 100 does not include the first metal element 150 and the second metal element 160. The horizontal axis represents the operational frequency (MHz), and the vertical axis represents the return loss (dB). According to the measurements illustrated in FIG. 3, if the first metal element 150 and the second metal element 160 are removed from the mobile device 100, the SAR of the antenna structure 180 will become very high within the second frequency band FB2 and the third frequency band FB3, and it will be difficult to pass current legal regulations.

Figure 4:
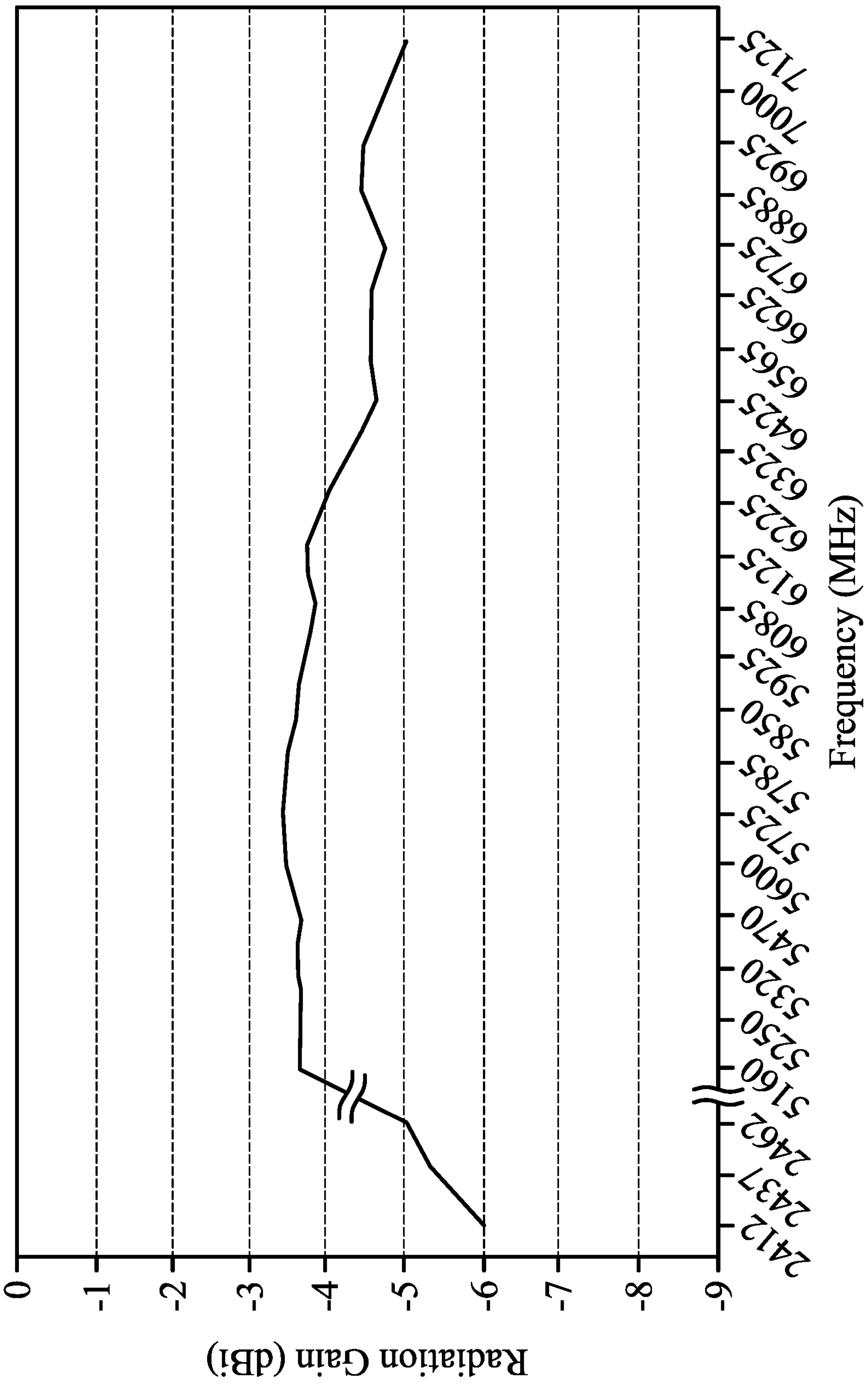
FIG. 4 is a diagram of radiation gain of an antenna structure of a mobile device according to an embodiment of the invention.

FIG. 4 is a diagram of radiation gain of the antenna structure 180 of the mobile device 100 according to an embodiment of the invention. The horizontal axis represents the operational frequency (MHz), and the vertical axis represents the radiation gain (dBi). According to the measurements illustrated in FIG. 4, the radiation gain of the antenna structure 180 of the mobile device 100 can achieve-6 dBi or higher within the first frequency band FB1, the second frequency band FB2, and the third frequency band FB3 as mentioned above. It can meet the requirements of practical applications of general mobile communication devices.

In some embodiments, the element sizes of the mobile device 100 will be described below. The length L1 of the grounding radiation element 140 may be substantially equal to 0.25 wavelength (λ/4) of the first frequency band FB1 of the antenna structure 180 of the mobile device 100. The total length L2 of the feeding radiation element 110 and the first radiation element 120 may be substantially equal to 0.25 wavelength (λ/4) of the third frequency band FB3 of the antenna structure 180 of the mobile device 100. The total length L3 of the feeding radiation element 110 and the second radiation element 130 may be substantially equal to 0.25 wavelength (λ/4) of the second frequency band FB2 of the antenna structure 180 of the mobile device 100. In the grounding radiation element 140, the width W1 of the wide portion 144 may be at least twice the width W2 of the narrow portion 145. For example, the aforementioned width W1 may be from 2 mm to 3 mm, and the aforementioned width W2 may be from 1 mm to 1.5 mm. The length L4 of the first metal element 150 may be substantially equal to 0.25 wavelength (λ/4) of the first resonant frequency interval FR1 of the mobile device 100. The length L5 of the second metal element 160 may be substantially equal to 0.25 wavelength (λ/4) of the second resonant frequency interval FR2 of the mobile device 100. The width of the first coupling gap GC1 may be form 1 mm to 1.5 mm. The width of the second coupling gap GC2 may be form 1 mm to 2 mm. There is a specific distance D1 between the first metal element 150 and the edge 171 of the dielectric substrate 170. The specific distance D1 may be shorter than or equal to 0.5 mm. The above ranges of element sizes are calculated and obtained according to the results of many experiments, and they help to optimize the SAR, the operational bandwidth, and the impedance matching of the antenna structure 180 of the mobile device 100.

Figure 5:
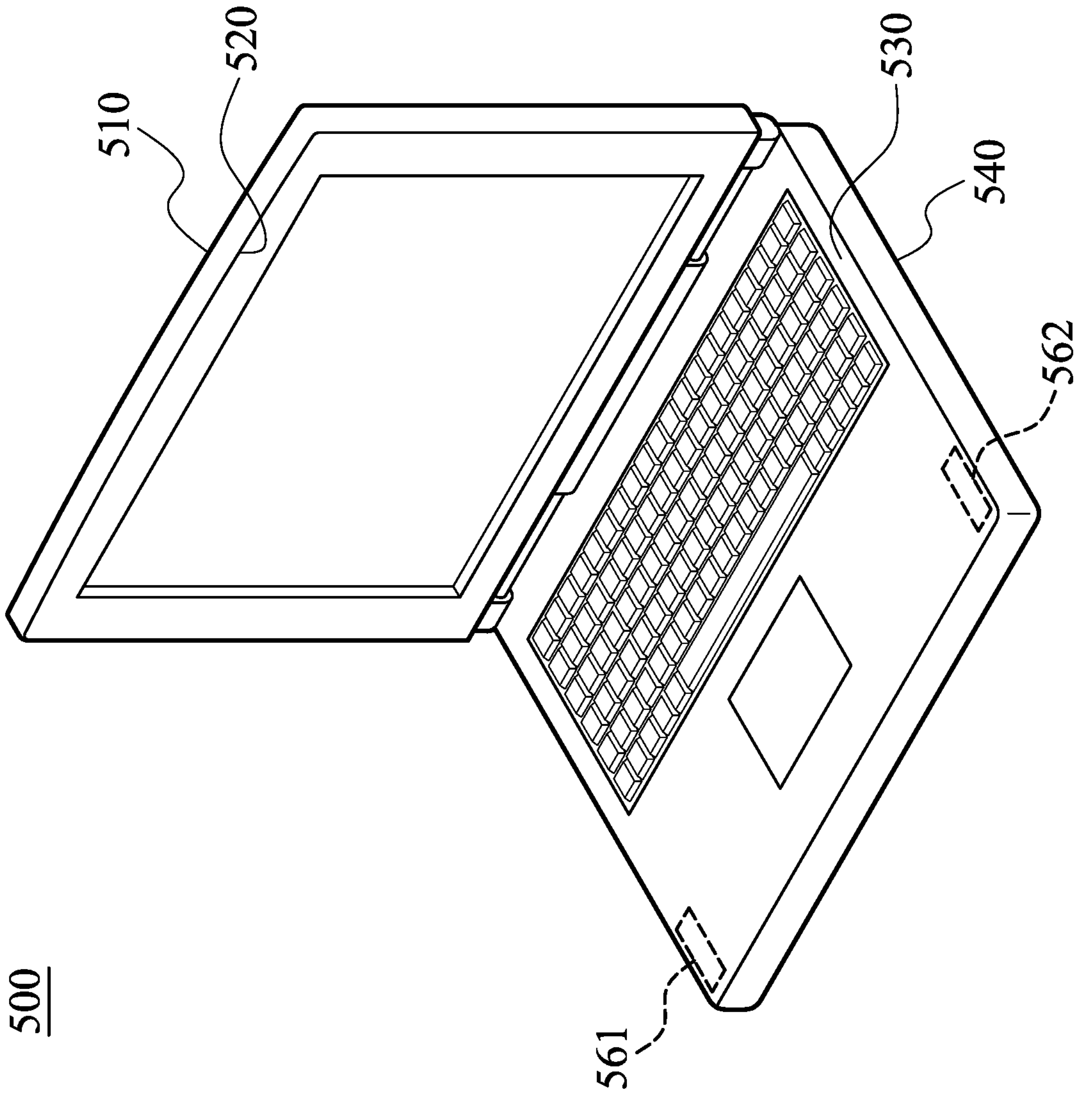
FIG. 5 is a perspective view of a mobile device according to an embodiment of the invention.

FIG. 5 is a perspective view of a mobile device 500 according to an embodiment of the invention. In the embodiment of FIG. 5, the mobile device 500 is a notebook computer and includes an upper cover housing 510, a display frame 520, a keyboard frame 530, and a base housing 540. It should be understood that the upper cover housing 510, the display frame 520, the keyboard frame 530, and the base housing 540 are equivalent to the so-called "A-component", "B-component", "C-component" and "D-component" in the field of notebook computers, respectively. The antenna structure 180 as described in the embodiment of FIG. 1 may be disposed at a first position 561 or a second position 562, and it may be positioned between the keyboard frame 530 and the base housing 540. It should be understood that the first metal element 150 and the second metal element 160 as mentioned above are also disposed adjacent to the antenna structure 180. According to practical measurements, such a design can help to minimize the SAR of the antenna structure 180 of the mobile device 500. In some embodiments, the mobile device 500 is implemented in a convertible mobile device, which operates in a notebook mode or a tablet mode, but it is not limited thereto. Other features of the mobile device 500 of FIG. 5 are similar to those of the mobile device 100 of FIG. 1. Accordingly, the two embodiments can achieve similar levels of performance.

The invention proposes a novel mobile device and its antenna structure. Compared to the conventional design, the invention has at least the advantages of low SAR, small size, wide bandwidth, low manufacturing cost, and good communication quality, and therefore it is suitable for application in a variety of mobile communication devices.

Note that the above element sizes, element shapes, and frequency ranges are not limitations of the invention. An antenna designer can fine-tune these settings or values according to different requirements. It should be understood that the mobile device and antenna structure of the invention are not limited to the configurations of FIGS. 1-5. The invention may merely include any one or more features of any one or more embodiments of FIGS. 1-5. In other words, not all of the features displayed in the figures should be implemented in the mobile device and antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device for reducing SAR (Specific Absorption Rate), comprising:
- a feeding radiation element, having a feeding point;
- a first radiation element, coupled to the feeding radiation element;
- a second radiation element, coupled to the feeding radiation element, wherein the second radiation element and the first radiation element substantially extend in opposite directions;
- a grounding radiation element, coupled to a ground voltage, wherein the grounding radiation element is adjacent to the first radiation element and the second radiation element;
- a first metal element, coupled to the grounding radiation element;
- a second metal element, coupled to the ground voltage, wherein the second metal element is adjacent to the feeding radiation element; and
- a dielectric substrate, wherein the feeding radiation element, the first radiation element, the second radiation element, the grounding radiation element, the first metal element, and the second metal element are disposed on the dielectric substrate;
- wherein an antenna structure is formed by the feeding radiation element, the first radiation element, the second radiation element, and the grounding radiation element;
- wherein the grounding radiation element substantially has a variable-width L-shape and comprises a wide portion and a narrow portion, and the narrow portion is coupled through the wide portion to the ground voltage.

2. The mobile device as claimed in claim 1, wherein a combination of the feeding radiation element, the first radiation element, and the second radiation element substantially has a T-shape.

3. The mobile device as claimed in claim 1, wherein the antenna structure covers a first frequency band, a second frequency band, and a third frequency band.

4. The mobile device as claimed in claim 3, wherein the first frequency band is from 2400 MHz to 2500 MHz, the second frequency band is from 5150 MHz to 5850 MHz, and the third frequency band is from 5925 MHz to 7125 MHz.

5. The mobile device as claimed in claim 3, wherein a total length of the feeding radiation element and the first radiation element is substantially equal to 0.25 wavelength of the third frequency band.

6. The mobile device as claimed in claim 3, wherein a total length of the feeding radiation element and the second radiation element is substantially equal to 0.25 wavelength of the second frequency band.

7. The mobile device as claimed in claim 3, wherein a length of the grounding radiation element is substantially equal to 0.25 wavelength of the first frequency band.

8. The mobile device as claimed in claim 3, wherein the first metal element is excited to generate a first resonant frequency interval, and the second metal element is excited to generate a second resonant frequency interval.

9. The mobile device as claimed in claim 8, wherein the first resonant frequency interval is from 4500 MHz to 4800 MHZ.

10. The mobile device as claimed in claim 8, wherein the second resonant frequency interval is from 7500 MHz to 7800 MHz.

11. The mobile device as claimed in claim 8, wherein a length of the first metal element is substantially equal to 0.25 wavelength of the first resonant frequency interval.

12. The mobile device as claimed in claim 8, wherein a length of the second metal element is substantially equal to 0.25 wavelength of the second resonant frequency interval.

13. The mobile device as claimed in claim 1, wherein the first metal element substantially has a straight-line shape.

14. The mobile device as claimed in claim 1, wherein the second metal element substantially has an L-shape.

* * * * *